UNITED STATES PATENT OFFICE.

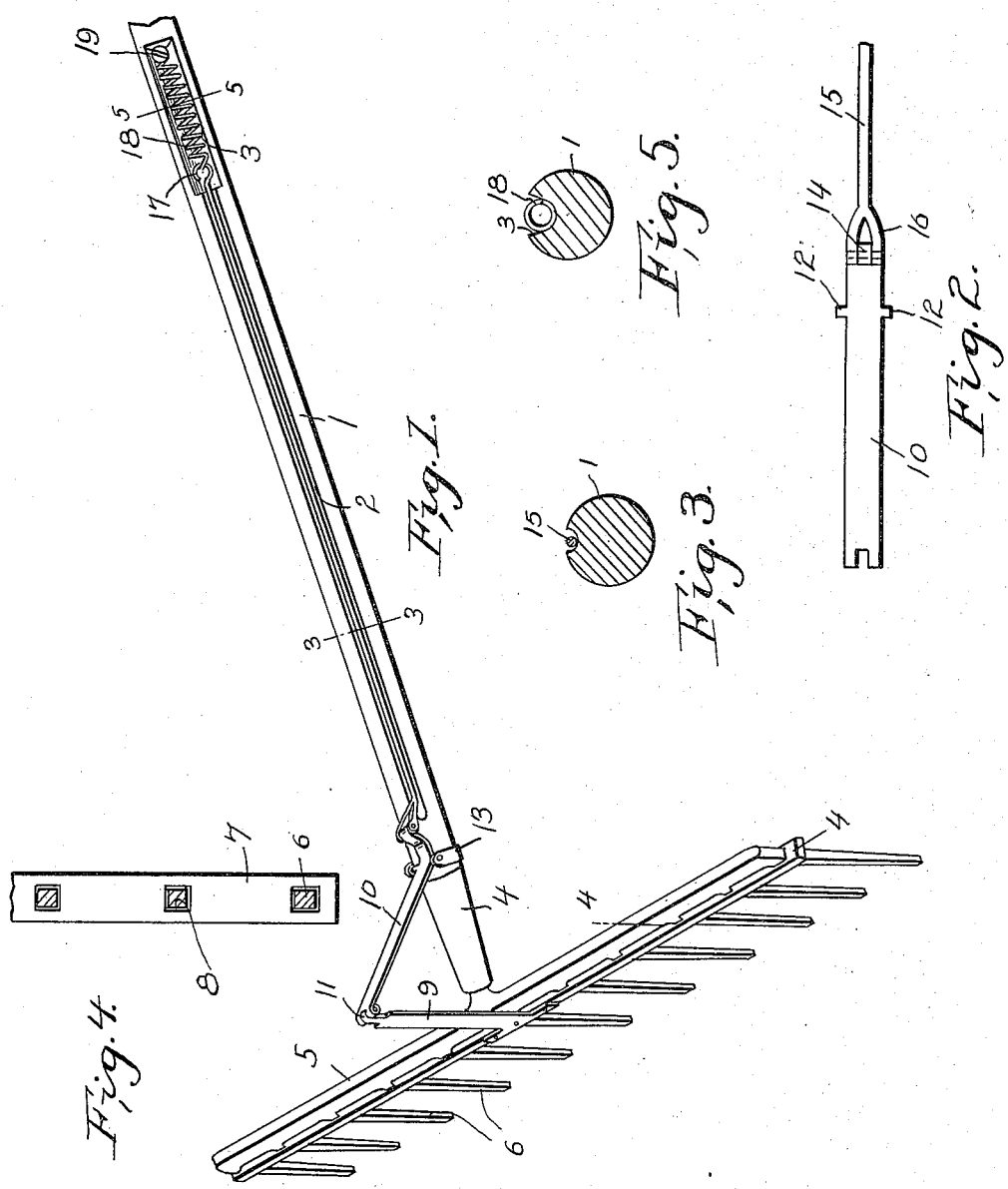

SAMUEL E. DOUGLASS, OF MOUNT GILEAD, NORTH CAROLINA.

RAKE-CLEANER.

1,155,897.   Specification of Letters Patent.   Patented Oct. 5, 1915.

Application filed December 23, 1913. Serial No. 808,425.

*To all whom it may concern:*

Be it known that I, SAMUEL E. DOUGLASS, a citizen of the United States, residing at Mount Gilead, in the county of Montgomery and State of North Carolina, have invented certain new and useful Improvements in Rake-Cleaners; and I do hereby declare the following to be a full, clear, and exact description of the invention, such as will enable others skilled in the art to which it appertains to make and use the same.

This invention relates to new and useful improvements in rake cleaners, and has for its principal object to provide a simple and effective means by which the teeth of a rake may be stripped of any foreign matter or trash which may have gathered thereon.

Another object of the invention is to provide a device which will automatically return to its raised position and leave the teeth in operative condition.

A still further object of the invention is the provision of a novel combination and arrangement of parts which will be particularly simple in operation, easy to manufacture and cheap in construction.

With the above and other objects in view, the invention consists in the combination and arrangement of parts which will be more fully set forth in the following specification and accompanying drawings, in which—

Figure 1 is a detail perspective view of a rake constructed in accordance with this invention, Fig. 2 is a view of the lever which actuates the stripping bar, Fig. 3 is a transverse sectional view taken on line 3—3 of Fig. 1, Fig. 4 is an enlarged sectional view taken on line 4—4 of Fig. 1, and Fig. 5 is an enlarged detail sectional view taken on line 5—5 of Fig. 1.

Referring now to the drawings by characters of reference, the numeral 1 designates as an entirety, the handle of the rake which is constructed in accordance with this invention, and has formed therein the longitudinally extending groove 2. The groove 2 terminates at its upper extremity in a suitable enlarged recess 3, the use of which will more fully hereinafter described. At the end of the rake handle opposite the recessed end, is provided the usual ferrule 4 into which the connecting element of the head indicated generally by the numeral 5 extends.

The rake head referred to by the numeral 5 has formed integral therewith and extending downwardly therefrom the usual teeth 6 which are of the usual tapered construction. A suitable stripping bar 7 which is provided with a plurality of spaced apertures 8 through which the teeth 6 are adapted to extend, is slidably mounted on the rake teeth and is provided with the upwardly extending member 9 to which the long end of the lever 10 is pivotally secured as at 11. The lever 10 above referred to, which is best illustrated in Fig. 2, is provided near one end with the lateral extensions 12 which project through suitable apertures formed in the U-shaped member 13 which is secured to and partially surrounds the rake handle as clearly shown in Fig. 1. A tongue 14 is formed integral with the short end of the lever 10 as clearly illustrated in Fig. 2 and is adapted to be bent around to form a loop, the use of which will be more fully hereinafter described.

Slidably mounted in the groove 2 of the handle 1, is provided the operating rod 15 having a bifurcated end 16 formed integral therewith which is pivotally secured to the tongue 14 as clearly shown in Fig. 2. This operating rod 15 extends up the handle to the recess portion thereof, and is provided with the loop 17 by means of which the spring 18 is operatively connected with the operating rod as clearly shown in Fig. 1. The end of the spring opposite the loop 17 is secured to the rake handle as at 19, and is so arranged as to hold the spring under tension at all times.

It will be clearly seen from the foregoing, that in use, the rake is turned so that the teeth extend upwardly and the whole will rest on the pivoted end 11 of the lever 10. In this position it will be evident the operating bar 15 and the spring 18 will drop from the groove 2 and recess 3 respectively so that the loop 17 will not engage the end wall of the recess and thus the weight of the several parts will assist in forcing the stripping bar toward the ends of the rake teeth and no interference will be encountered as the loop 17 cannot engage the end wall of the recess. As soon as the weight is released from the lever 10, it will be evident that through the action of the spring 18, the rod 15 will be drawn back to its normal position and that action will exert pull on the lever 10, thus returning the stripping bar to its normal position illustrated in Fig. 1, thereby placing the rake in condition for use. It will also be evident that the spring and bar 15 will again rest in the recess and groove respectively.

While in the foregoing I have shown and described the preferred embodiment of my invention, I wish it to be understood that I may make such changes in the combination and arrangement of parts as will come within the scope of the claim appended hereto.

Having thus described my invention, I claim:

A rake cleaner of the character described comprising a handle, said handle being formed with a longitudinal groove and having a recess at the upper end of the groove, a rake head secured to the handle at the end opposite the recess end, a stripping bar slidable on the rake head, a standard extending upwardly from the stripping bar intermediate its ends, a U-shaped yoke surrounding the handle near the head, a lever pivoted between the ends of the arms of the yoke, the free ends of the lever being pivoted to the standard, an upstanding arm at the end of the lever opposite the pivoted end, an operating rod arranged to seat in the groove in the handle, a bifurcated end on the operating rod pivoted to the upstanding arm on the lever, a loop on the opposite end of the operating rod, and extending within the recess in the handle, a spring secured to the loop and resting in the recess, the opposite end of the spring being secured to the handle, the loop, operating bar and spring being disengaged from the walls of the groove and recess when the rake is inverted so that the loop will not engage the end walls of the recess and thereby permit the stripping bar to slide toward the ends of the rake teeth.

In testimony whereof I affix my signature in presence of two witnesses.

SAMUEL E. DOUGLASS.

Witnesses:
W. A. McAULAY,
JOHN A. McAULAY.

Copies of this patent may be obtained for five cents each, by addressing the "Commissioner of Patents, Washington, D. C."